United States Patent [19]

Galonska et al.

[11] 4,036,110
[45] July 19, 1977

[54] POWER STEERING GEAR WITH PISTON NUT AND SCREW OPERATIVELY CONNECTED BY CENTRALIZING ROOT DIAMETER THREAD

[75] Inventors: David A. Galonska; James B. McCarthy; Joseph A. Rutkiewicz, all of Saginaw, Mich.

[73] Assignee: General Motors Corporation, Detroit, Mich.

[21] Appl. No.: 631,838

[22] Filed: Nov. 14, 1975

[51] Int. Cl.$^2$ ............................ F15B 9/10; F15B 13/10
[52] U.S. Cl. .............................. 91/375 A; 91/391 R; 74/424.8 R; 74/459
[58] Field of Search .................. 74/458, 459, 424.8 R; 91/380, 375 A, 391 R

[56] References Cited

U.S. PATENT DOCUMENTS

| | | | |
|---|---|---|---|
| 1,367,499 | 2/1921 | Rapson | 74/459 |
| 2,273,784 | 2/1942 | Kahl | 74/458 |
| 3,022,772 | 2/1962 | Zeigler et al. | 91/375 A |
| 3,075,500 | 1/1963 | Mazur et al. | 91/380 |
| 3,081,644 | 3/1963 | Hudgens et al. | 74/424.8 R |
| 3,648,535 | 3/1972 | Maroth | 74/459 |
| 3,935,790 | 2/1976 | Goff | 91/375 A |

*Primary Examiner*—Paul E. Maslousky
*Attorney, Agent, or Firm*—Charles R. White

[57] ABSTRACT

This power steering gear comprises a piston nut movably mounted in a housing for turning a gear sector and the steerable wheels of a vehicle operatively connected thereto. The piston nut is mechanically moved by a rotatable screw, threadedly engaged with the piston nut and operatively connected to an input stub shaft. Hydraulic power assist is provided with the piston nut forming separate expansible and contractible chambers filled with hydraulic fluid and controlled by integral valve means in the gear. The threads of the piston nut and screw are profiled to contact at their minor diameters to increase thread efficiency by reducing the friction radius. The threads of the piston nut are made with optimized thickness to reduce flank clearance to further restrict the hydraulic flow path through the thread to effectively seal the chambers from each other.

3 Claims, 3 Drawing Figures

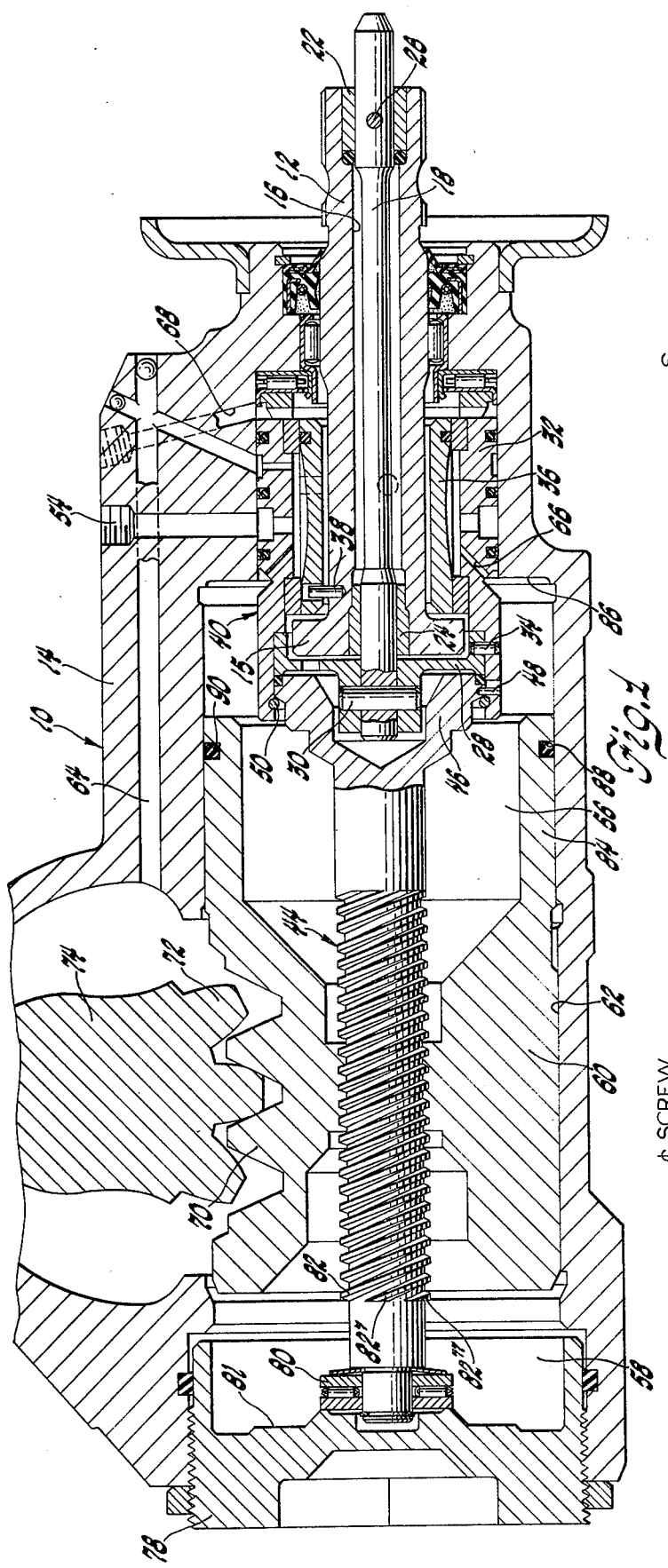

POWER STEERING GEAR WITH PISTON NUT AND SCREW OPERATIVELY CONNECTED BY CENTRALIZING ROOT DIAMETER THREAD

This invention relates to a power steering gear and more particularly to a new and improved piston nut and screw assembly in a power steering gear having meshing acme type threads modified to improve sealing between a pair of expansible and contractible hydraulic fluid chambers and to reduce the friction radius therebetween for improving operating efficiency.

It has been the practice in many modern integral power steering gear designs to employ a piston nut operatively connected to a worm by a series of balls which circulate to provide for reduced friction between the worm and the nut. Such construction requires reduced effort to move the piston nut in the gear housing as compared to many prior threaded devices. Since the piston nut divides the gear housing into separate fluid receiving chambers for receiving pressure fluid from a control valve, it was necessary to provide auxiliary sealing means between the worm and the piston nut to prevent excessive leakage between the chambers. While such auxiliary seals have proved to be effective in many designs, their employment has added to power steering gear cost and complexity and increased the friction between the piston nut and screw.

For simplifying power steering gear designs, meshing acme screws of both centralizing and general purpose threads have been used or proposed to drivingly connect the power steering screw and the cooperating piston nut. With acme threads that are centralizing, the major diameter of the screw and nut contact before the flanks of the threads contact. With general purpose acme threads the flanks of the threads contact before either the major or minor diameter contact. Such designs have in many instances been unsatisfactory since the friction radius between the two threaded parts is high resulting in increased effort for moving the piston nut in the housing. Additionally, these prior designs did not provide a highly efficient seal between the two fluid chambers so that auxiliary sealing was still needed in many cases.

In this invention there is a new and improved steering gear design which permits the piston nut to be readily moved in the housing by actuation of a screw member through an input stub shaft. The screw and piston nut are interconnected by a modified acme thread design which materially reduces the friction radius between these two members and which reduces the flow path between the two chambers in the unit and thus provide for improved sealing without auxiliary sealing means.

It is a feature, object and advantage of this invention to provide a new and improved power steering gear incorporating a piston nut axially movable in a gear unit housing interconnected with a screw by a modified acme thread design which centralizes the screw in the piston nut and which improves efficiency of the thread by decreasing the friction radius between the two members and which provides an effective seal between separate hydraulic chambers formed by the piston nut.

Another feature, object and advantage of this invention is to provide an integral power steering gear with a piston nut drivingly connected to a screw rotatably mounted in the housing and extending through the piston nut by a modified acme thread design which reduces the clearances between the mating threads so that the flow path between the separate pressure chambers in the units is reduced to such an extent that a pressure differential in the separate chambers can be effectively maintained for power assisted steering.

Another feature, object and advantage of this invention is to provide a new and improved thread connection having minor diameter contact between a piston nut and a screw in a power steering gear which provides a reduced friction radius between the nut and screw.

These and other features, objects and advantages of the invention will be more apparent from the following detailed description in which:

FIG. 1 is a side view of a power steering gear with certain parts in section and certain other parts in elevation.

FIG. 2 is an enlarged view of a portion of FIG. 1 showing the thread form interconnecting the screw and piston nut.

FIG. 3 is a view similar to the view of FIG. 2 showing the stock buildup of the thread of the piston nut to provide for improved operation of the steering gear.

Turning now in greater detail to the drawing, there is shown in FIG. 1 a power steering gear 10 having an elongated stub shaft 12 mounted for turning movement in a steering gear housing 14 and terminating in an enlarged annular head portion 15. The stub shaft has an axial passage 16 therethrough which receives a torsion bar 18 supported for twisting movement therein by bearings 22 and 24. The outer end of the torsion bar is secured by pin 26 to the stub shaft 12 while the inner end is drivingly connected to an annular end cap 28 by a connector pin 30. The end cap 28 is in turn operatively connected to cylindrical valve body 32 by connector pin 34. The valve body 32 extends axially in the housing and is supported for limited turning movement therein with respect to a valve spool 36 concentric with valve body 32. The valve body 32 is connected to the stub shaft 12 by radial pin 38 for turning movement therewith.

The valve body and valve spool are relatively rotatable with respect to each other in response to turning movement of the stub shaft and form a valve assembly 40 controlling the hydraulic operation of the steering gear.

An elongated screw or worm 44 extends axially in the housing 14 from the valve assembly 40. As shown, the screw has an enlarged annular head 46 which nests within the inner end of the valve body 32 and which is secured thereto by pin and slot means 48 and by a retainer ring 50. These two connections prevent axial separation of the screw and the valve body as well as their relative rotation. The screw is also operatively connected to the head 15 of the stub shaft 12 by a suitable lost-motion mechanism which is known in the art and is fully described in the U.S. Pat. No. 3,022,772 issued Feb. 27, 1962 to P. B. Zeigler et al for Rotary Power Steering Valve with Torsion Bar Centering and in copending application Ser. No. 631,839 to R. P. Rohde et al for Compact Power Steering Gear filed Nov. 14, 1975, now U.S. Pat. No. 4,009,641. These disclosures are hereby incorporated by reference.

The valve assembly 40 is fed with pressure fluid from a power steering pump through an inlet passage 54. The valve assembly 40 controls the supply and exhaust of pressure fluid to and from pressure chambers 56 and 58 formed on either side of a piston nut 60 slidably mounted in a bore 62 formed in housing 14. As shown, passage 64 in the housing 14 hydraulically connects the chamber 58 with the valve assembly 40 and passage 66 in the valve body 32 hydraulically connect chamber 56 with the valve assembly. Passage 68 is an exhaust passage for conducting fluid from the valve assembly 40 back to the power steering pump as more fully described in the above-referenced patent to Zeigler et al. and the application Ser. No. 631,839 to Rhode et al.

The piston nut 60 has a rack whose teeth 70 mesh with the teeth 72 of a sector gear 74 mounted for limited turning movement in housing 14. The sector gear 74 is operatively connected through a pitman shaft and an associated construction to the dirigible wheels of the vehicle which are not shown.

The gear housing 14 is closed by an adjuster plug 78 threaded into one end thereof. As shown, the screw 44 extends axially in the housing and is supported at one end by a thrust bearing assembly 80 operatively disposed between the adjuster plug and a shoulder on screw 44. The interior radial wall 81 of this plug serves as a stop to limit the stroke of the piston nut in moving to the left. The screw 44 is threaded through the piston nut 60 and as shown in FIG. 1 has multiple start threads 82, 82' and 82'' which mesh with corresponding threads in the piston nut. The piston nut 60 has a cylindrical skirt 84 which extends axially in the bore 62 toward the radial end wall 86 formed in the housing 14 at one end of bore 62. This end wall serves as a limit stop for the piston when fully stroked to the right in viewing FIG. 1. Disposed in an annular groove 88 adjacent to the end of the skirt is an annular seal 90 which contacts the inner wall of the bore 62 to provide for the separate fluid chambers 56 and 58.

The centralizing threads of the screw mesh with the corresponding threads on the internal diameter of the piston nut and details of this threaded connection are illustrated in FIGS. 2 and 3. As shown, the profile of the thread of piston nut 60 has a working depth or height "H" that extends into the thread space between the adjacent threads of the screw 44 and into contact with the annular bottom surface between the corresponding screw threads.

The threaded connection is thus minor diameter contacting which centralizes the piston nut and screw to facilitate the alignment and ease of operation of these parts. The minor diameter contact of the piston nut and screw also provides for a substantial reduction in friction therebetween as compared to prior art acme and general purpose threaded connections. The friction radius of the minor diameter contact is diagrammatically represented in FIG. 2 by radius R extending from centerline 94 of the screw 44. This radius is materially less than the friction radius of an acme thread design represented by radius R' in which there would be major diameter contact. The friction radius of general purpose thread designs would be larger than the friction radius of the threaded connection of this invention. Furthermore the threads would have flank contact rather than minor or major diameter contacts resulting in the undesirable wedging action between the threads and a high coefficient of friction. It will be therefore appreciated that the substantially reduced friction radius between the screw and piston nut provided by this invention results in increased thread efficiency permitting the piston nut to be readily displaced to different positions in the bore as compared to prior art acme and general purpose threaded designs.

The thread design of this invention further provides for a controlled flow rate between the chambers which is reduced to a point where a pressure differential can be effectively maintained in chambers 56 and 58. In viewing FIG. 3 the thickness of the thread of the piston nut 60 has been increased to an optimum thickness diagrammatically illustrated by area T. This reduces the side or flank clearance between the piston nut and screw threads and thereby reduces the capacity of the helical flow path through the piston nut which connects chambers 56 and 58. In addition to the increased width to decrease flank clearance, the addition of stock S to increase the profile of the tips of the threads of the piston nut diminishes minor diameter clearances and provides for the minor diameter contact. With these clearance reductions, there is resultant improved control and diminution of the leakage rate between chambers 56 and 58. Thus this invention provides a labyrinth type seal between the two chambers with improved sealing of the helical path by the diminished flank clearance and improve sealing of axial flow by the minor diameter contact. This invention thereby eliminates the need and requirement for auxiliary sealing devices as required by the prior art ball screw mechanism as well as prior acme and general purpose thread connections.

The valve assembly 40 controls the supply and exhaust of pressure fluids from chambers 56 and 58 for stroking the piston nut to different positions as determined by the amount of rotation of the vehicle steering wheel and the stub shaft 12 operatively connected thereto. The actuation and hydraulic operation of the valve assembly of the preferred embodiment of this invention is the same as that described in the above referenced U.S. Pat. No. 3,022,722 to Zeigler et al. and further detailed descriptions of the valve and its operation are not necessary.

Assuming that there is a pressure differential in chambers 56 and 58 as provided by actuation of the valve in executing a turn and assuming the pressure in chamber 58 is higher than the pressure in chamber 56 the piston nut 60 will be stroked towards the right to cause resultant turning movement of the sector gear 74 and the dirigible wheels of the vehicle. The movement of the piston nut will be improved over the prior art construction since the friction radius between the piston nut and the screw rotated thereby is substantially reduced and since there is no auxiliary seal provided drag loads between these relatively rotatable parts as previously required. Piston nut movement to the left would be opposite to that described so that further description is not needed. In the event there is a substantial reduction in the pressure supplied to the power steering gear the lost motion device provides for the direct mechanical rotation of the screw 44 so that the piston nut 60 can be mechanically displaced with relative ease with the friction radius substantially reduced as previously described.

While a preferred embodiment of this invention has been shown and described to illustrate the invention other embodiments will become apparent to those skilled in the art. Accordingly the scope of this invention is set forth in the following claims.

What is claimed is:

1. A power steering gear unit comprising a housing, an input member operatively mounted for turning movement in said housing and extending outside one end thereof, an output member operatively mounted for turning movement in said housing, piston means mounted for longitudinal sliding movement in said housing and cooperating therewith to provide first and second expansible and contractible fluid pressure chambers therein, gear means drivingly connecting said piston means to said output member so that said output member turns in response to sliding movement of said piston means, valve means in said housing operatively connected to said input member and having a connection to a source of pressurized hydraulic fluid for selectively supplying and exhausting pressurized fluid to and from said chambers to hydraulically move said piston means and said connected output member to predetermined positions as controlled by the amount of movement of said input member, elongated actuator means extending through said piston means and operatively connected to said input member for turning movement therewith, mechanical drive means operatively interconnecting said actuator means and said piston means to permit said actuator means to move said piston means in said housing, said mechanical drive means comprising first thread means formed externally on said actuator and second thread means formed internally in said piston, said second thread means having a screw thread profile with a major diameter spaced from a major diameter of the second thread means and a minor diameter which directly contacts a minor diameter of the thread of said first thread means to decrease a friction radius between said piston and said actuator means to facilitate the movement of said piston by said actuator means and further to reduce an axial flow path of fluid through said piston means so that pressure differentials can be built up in said chambers for the hydraulic actuation of said piston means.

2. A power steering gear unit comprising a housing, an input member operatively mounted for turning movement in said housing and extending outside one end thereof, an output member operatively mounted for turning movement in said housing, piston means mounted for longitudinal sliding movement in said housing and cooperating therewith to provide first and second expansible and contractible fluid pressure chambers therein, gear means drivingly connecting said piston means to said output member so that said output member turns in response to sliding movement of said piston means, valve means in said housing operatively connected to said input member and having a connection to a source of pressurized hydraulic fluid for selectively supplying and exhausting pressurized fluid to and from said chambers to hydraulically move said piston means and said connected output member to predetermined positions as controlled by the amount of movement of said input member, elongated actuator means extending through said piston means and operatively connected to said input member for turning movement therewith, mechanical drive means operatively interconnecting said actuator means and said piston means to permit said actuator means to move said piston means in said housing, said mechanical drive means comprising first thread means formed externally on said actuator and second thread means formed internally in said piston, said first and second thread means having major diameter clearance and being minor diameter engaging to centralize the actuator in said piston means and to have a small friction radius, one of said thread means being formed with increased thread thickness to closely fit in the thread space of the other of said thread means for reduced clearance between the flanks of cooperating threads to thereby provide increased fluid sealing between said chambers.

3. A power steering gear unit comprising a housing, an input member operatively mounted for turning movement in said housing and extending outside one end thereof, an output member operatively mounted for turning movement in said housing, piston means mounted for longitudinal sliding movement in said housing and cooperating therewith to provide first and second expansible and contractible fluid pressure chambers therein, gear means drivingly connecting said piston means to said output member so that said output member turns in response to sliding movement of said piston means, valve means in said housing operatively connected to said input member and having a connection to a source of pressurized hydraulic fluid for selectively supplying and exhausting pressurized fluid to and from said chambers to effect the longitudinal sliding movement of said piston means and resultant movement of said connected output member to predetermined positions as controlled by the amount of movement of said input member, rotatable and elongated actuator means operatively connected to said input member and extending through said piston means, and a helical drive connection between said actuator means and said piston means to permit said actuator means to effect the longituinal sliding movement of said piston means and the resultant rotation of said output means, said helical drive connection comprising a screw and nut having modified acme threads with major and minor diameters and forming a fluid leakage path between said chambers, said acme threads being characterized in that the major diameter of the nut thread is spaced from the major diameter of the screw thread and the minor diameter of the nut thread directly contacts the minor diameter of the screw thread so that a friction radius of the screw and nut is at the minor diameter thereof to thereby maximize the efficiency of said helical drive connection and minimize fluid leakage through said leakage path between said chambers.

* * * * *